No. 849,617. PATENTED APR. 9, 1907.
W. F. HOWE.
POWER TRANSMISSION DEVICE.
APPLICATION FILED APR. 8, 1905.

3 SHEETS—SHEET 1.

Witnesses
Ray White.
Harry P. LeWhite

Inventor:
William F. Howe.
By Doree Bain Atty

No. 849,617. PATENTED APR. 9, 1907.
W. F. HOWE.
POWER TRANSMISSION DEVICE.
APPLICATION FILED APR. 8, 1905.

3 SHEETS—SHEET 3.

Witnesses:
Ray White
Harry R. L. White

Inventor:
William F. Howe
By Josée Dain Atty.

UNITED STATES PATENT OFFICE.

WILLIAM F. HOWE, OF CHICAGO, ILLINOIS.

POWER-TRANSMISSION DEVICE.

No. 849,617.  Specification of Letters Patent.  Patented April 9, 1907.

Application filed April 8, 1905. Serial No. 254,452.

*To all whom it may concern:*

Be it known that I, WILLIAM F. HOWE, of Chicago, in the county of Cook and State of Illinois, have invented certain new and useful Improvements in Power-Transmission Devices; and I hereby declare that the following is a full, clear, and exact description thereof, reference being had to the accompanying drawings, which form part of this specification.

My invention relates to improvements in power-transmission devices, and has for its object to provide an improved and efficient variable-speed frictional-gearing power-transmission device.

More specific objects and aims of my invention will become apparent to those skilled in the art from the following description, taken in conjunction with the accompanying drawings and appended claims.

Figure 1:
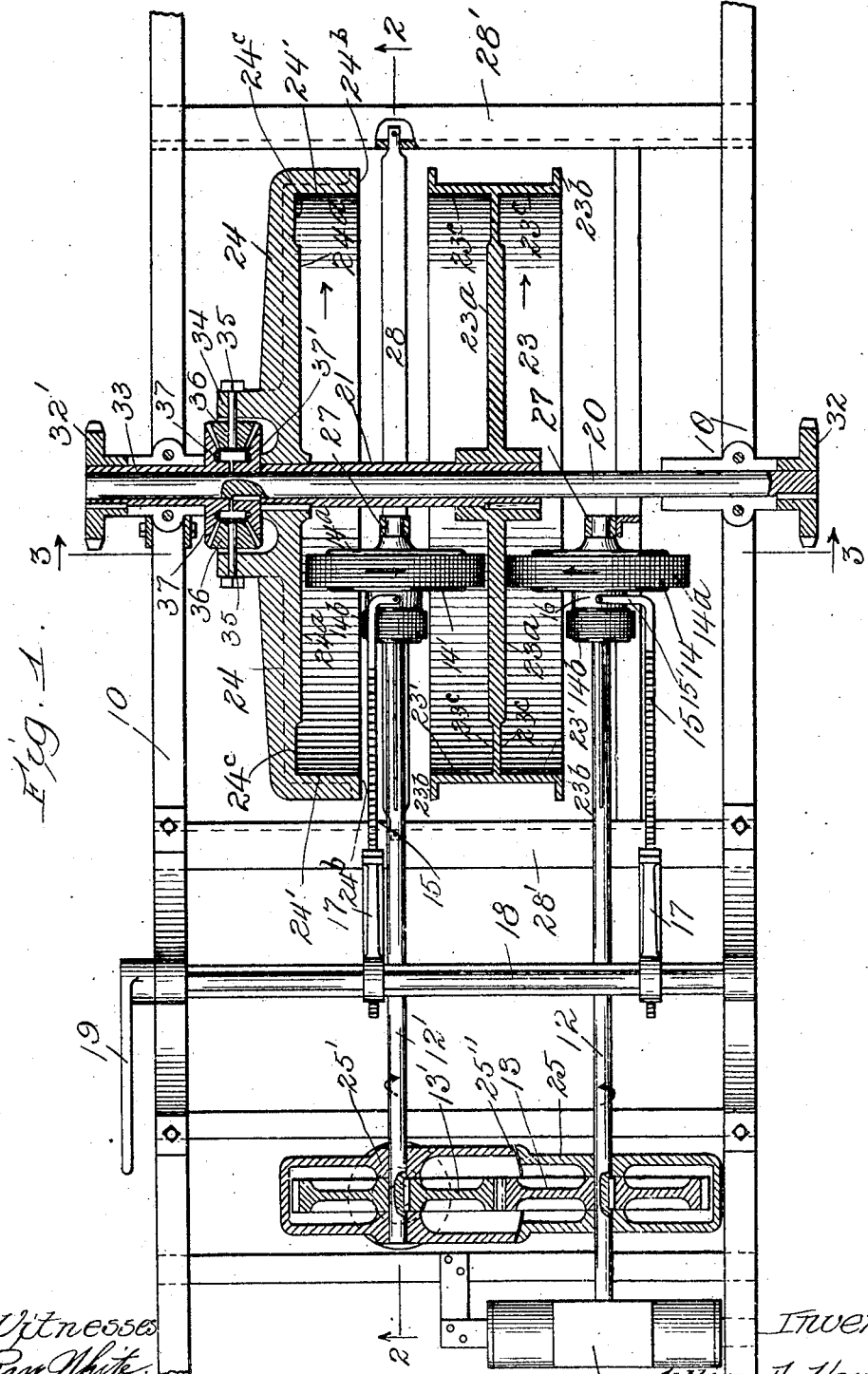
Figure 2:
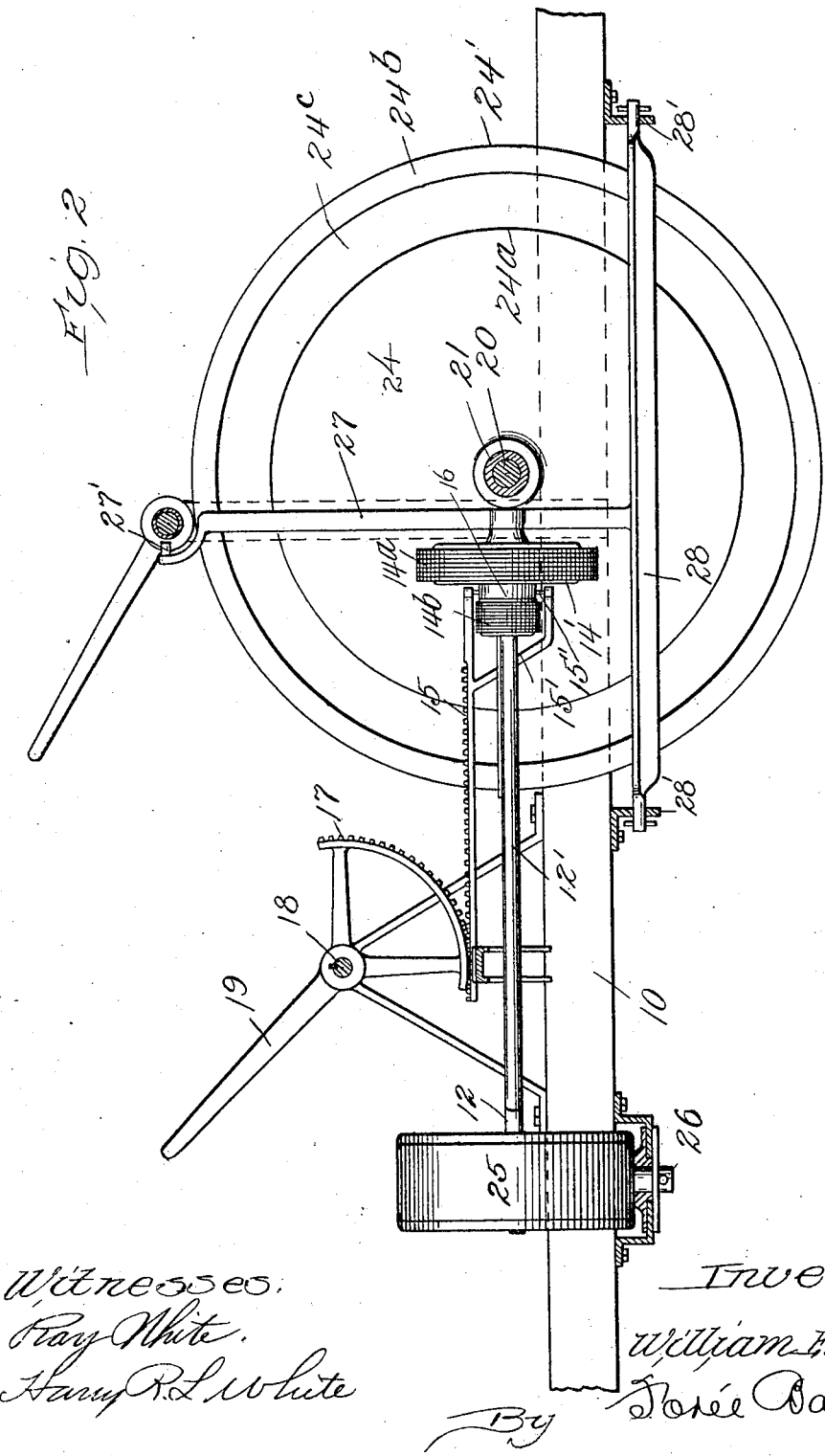
Figure 3:
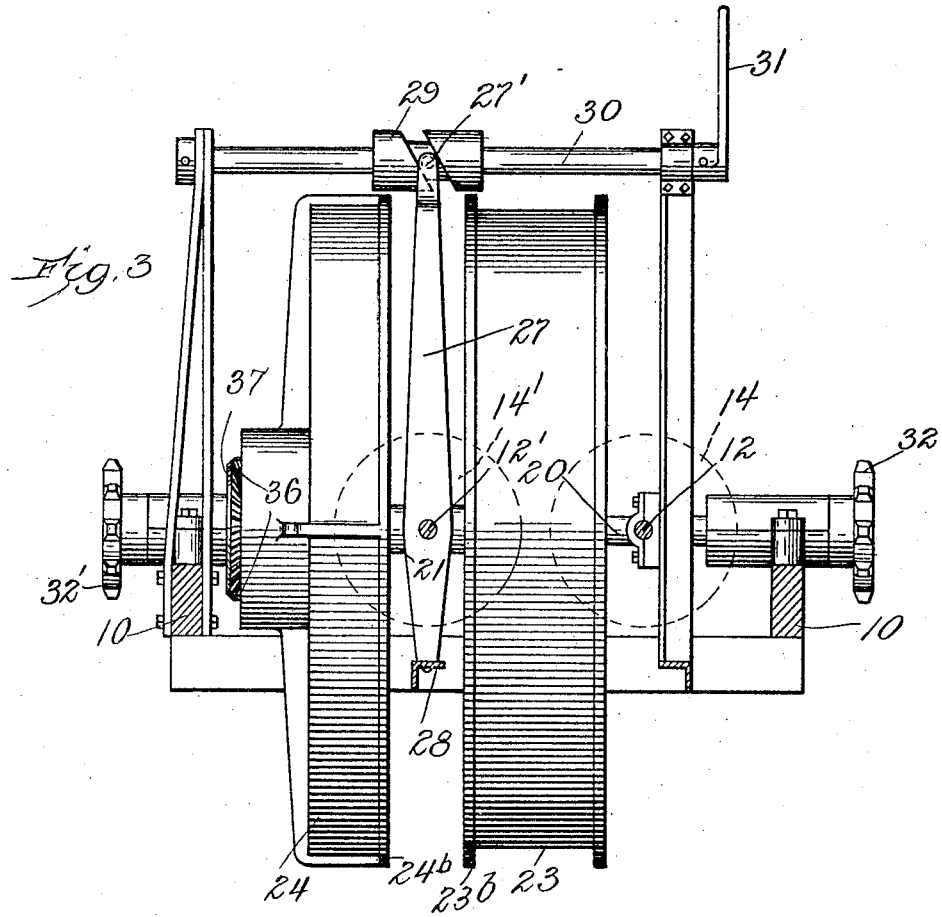
Figure 4:
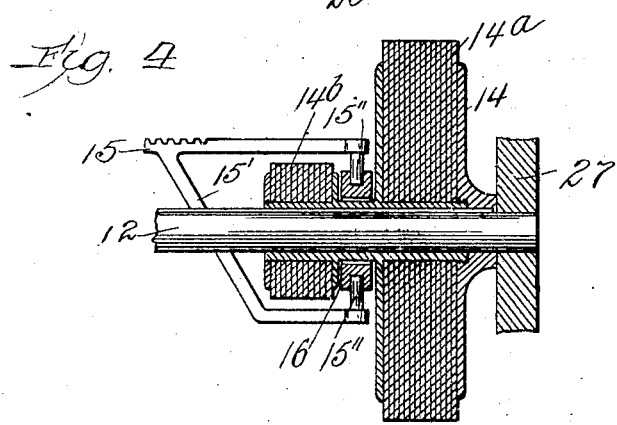

In the drawings, wherein I have illustrated an operative embodiment of my invention, Figure 1 is a plan view with parts in section of an apparatus constructed in accordance with my invention. Fig. 2 is a section therethrough on line 2 2 of Fig. 1. Fig. 3 is a section on line 3 3 of Fig. 1. Fig. 4 is a sectional detail of one of the driving-wheels of the frictional gearing.

Throughout the drawings like numerals of reference refer always to like parts.

In the drawings, 10 indicates in general a frame, which, it will be understood, may be of any suitable construction to afford the necessary support to the parts of the apparatus, and 11 indicates diagrammatically a motor, which may be of any suitable size and construction and which may be supported on said frame 10.

12 indicates what I will term the "primary" driving-shaft at one end, associated with the motor to be rotated thereby and extending in a direction which I will term a "longitudinal" direction.

12' indicates a driving counter-shaft, generally parallel to the shaft 12 and geared to the shaft 12 to rotate at like speed therewith, but in the opposite direction.

13 13' indicate, respectively, the gear members affixed to the shafts 12 and 12' and arranged in intermeshing relation to connect the shafts for the coincident action described. Upon the shafts 12 12' are the driving-wheels 14 14', connected to rotate with and to slide longitudinally on their respective shafts, as by means of spline-and-feather connection.

For certain purposes of my invention each driving-wheel preferably comprises two peripheral driving-surfaces of different diameters, as indicated at $14^a$ and $14^b$, said surfaces being preferably of material with a relatively high coefficient of friction, such as paper.

Suitable means are provided for simultaneously and coincidentally shifting the wheels 14 14' longitudinally of their respective shafts, such means being herein illustrated as comprising for each wheel a rack-arm 15, having a forked end 15', carrying fingers or pins 15'', engaging suitable recesses in a collar 16, loosely mounted upon some convenient part of the wheel, as in a space intermediate the driving portions $14^a$ and $14^b$, and in engagement with said rack-arm a gear-segment 17, mounted for oscillation upon a rock-shaft 18, suitably supported in the framework, said shaft 18 being common to both gear-segments and being preferably provided with a handle 19, whereby the shaft may be conveniently rocked.

Extending transversely of the frame and supported in suitable bearings therein is a driven shaft 20, operatively associated with which are the driven elements of the friction-gear.

The construction herein illustrated is one adapted for the transmission of power to two separate points of utilization through the agency of differential or equalizing gears, and for purposes of such construction the shaft 20 is provided with a sleeve 21, mounted for rotation therein, which said sleeve has directly connected thereto for rotation therewith the driving instrumentalities of the differential gearing.

Specifically, 23 indicates a driven disk having an annular driving-surface $23^a$ on each side thereof and located intermediate the peripheral surfaces of wheels 14 14'. The wheel 23 is provided with a rim 23', overhanging both the contact-surfaces $23^a$ and provided with flanges at opposite lateral sides, providing the annular contact-surfaces $23^b$. The parts are so arranged that when the surface $14^a$ of one of the driving-wheels contacts with the corresponding surface $23^a$ of the disk the contact-surface $14^b$ of the wheel is just without the plane of the annular contact-surface $23^b$. An annular groove or recess $23^c$ is made on each side of the disk at the point opposite which the surface $14^a$ in the wheel will come when its surface $14^b$ is moved into engagement with the surface 23$^b$ of the driven disk, said recess being deep enough to prevent the engagement of the surface 14$^a$ with the disk at the time when the surface 14$^b$ is engaging in corresponding surface 23$^b$.

24 indicates a reversing-disk having a contact-surface 24$^a$, an overhanging flange 24', providing the annular surface 24$^b$, and a groove 24$^c$, corresponding with the parts of the disk 23 indicated by similar exponents. Said reversing-disk is preferably fixedly mounted on the sleeve 21 and is disposed for coaction with one of the wheels 14 or 14', preferably the latter.

I provide means for causing the engagement for coaction of both of the driving-wheels and the driven disk or of one of said wheels and the reversing-disk. To this end I prefer that the wheel 14 be laterally immovable and that the wheel 14' and the driven disk 23 be sufficiently movable laterally of the frame to bring the three said members into coacting relation. Both bearings of the shaft 12 may therefore be stationary. The end of the laterally-movable shaft 12' remote from the friction-gearing preferably finds bearing in a pivoted structure, preferably a section 25' of a gear-casing, which said section is preferably mounted upon a vertical pivot 26 and has its open side cut in arc form, as shown at 25'', for engagement with the correspondingly-concaved side of the stationary section 25 of the gear-casing surrounding the gear member 13, the opposite end of the shaft 12' is mounted in a bearing preferably provided in a lever 27 at its lower end, connected with a longitudinally-extending pivot-bar 28, pivotally mounted in suitable transverse supports 28' 28'. The upper end of lever 27 may be provided with a pin 27', engaging a groove in a suitable cam 29, which may conveniently be mounted upon a shaft 30, provided with an operating-handle 31.

It will be apparent now that as the handle 31 is moved to rock the shaft 30 the upper end of the lever 27, through its engagement with the cam 29, will be shifted laterally one way or the other, carrying with it the end of the shaft 12' and moving the driving-wheel 14' into engagement with the primary driven disk 23, on the one hand, or the reversing-disk 24, on the other. When the driving-wheel 14 is laterally stationary, it will be apparent that the driven disk 23 must be moved into contact therewith, and to this end I mount the disk 23 upon its sleeve 21 with a suitable feather-and-spline connection to allow it a slight play longitudinally of the sleeve or laterally of the frame, so that as the wheel 14' is moved into contact therewith it in turn is crowded over into contact with the wheel 14.

Where it is desirable, as in automobile construction, to supply power independently to two points of utilization, two sprocket-wheels may be associated with the driven element, one (indicated by the numeral 32) being secured directly to the shaft 20 and the other (indicated at 32') being secured to a sleeve 33 upon said shaft. The reversing-disk 24 is provided with an outwardly-extending annulus 34, carrying pins 35, upon which are mounted the driving-pinions 36, intermeshing with two gears 37 37', the former secured direct to the shaft 20 and the latter secured to the sleeve 33, said parts constituting a compensating-gear connection. It will be apparent that when no compensating gear is to be employed such construction would be omitted and both disks and both sprockets mounted directly upon the shaft 20.

The operation of a device constructed as described will be apparent. Rotary motion impressed upon the driving-shaft 12 is communicated through the gears 13 13' to the shaft 12' to rotate the latter in the opposite direction, so that the wheels 14 14' are simultaneously and coincidentally but positively rotated. Assuming the lever 27 to be in a neutral position, such that the driving and driven elements of the friction-gear are all out of engagement with each other, and that forward motion is to be imparted to the sprockets 32 32' or other devices to be rotated, the handle 31 is moved in proper direction to cause the lever 27 to be thrown over toward the disk 23, moving wheel 14' into engagement with said disk 23 and forcing the latter into engagement with the wheel 14. Now both wheels 14 and 14' engaging opposite sides of the driven disk, but rotating in opposite directions, impart motion in the same direction to said disk, at the same time neutralizing the thrust against the disk, so there is no end thrust upon the shaft or sleeve to be driven. To change the speed, the pressure maintaining the driving-disk in driving relation is removed or slackened, and the driving-wheels are simultaneously shifted longitudinally of their shafts by the rack-and-segment mechanism described or such equivalent therefor as may be employed. To get a minimum speed with maximum torque, the wheels 14 14' are moved along their shafts until the surfaces 14$^b$ thereof are positioned for engagement with the surfaces 23$^b$ of the primary disk, and the several friction elements are then caused to engage for coaction the surfaces 14$^a$ of the wheels extending into the annular recesses 23$^c$ of the disk without making contact with the said disk. Rotary motion imparted to the disk 23 is communicated through its sleeve 21 to the reversing-disk and through the compensating gear, the driving elements of which are directly associated with said reversing-disk, to the shaft 20 and the sleeve 33 in a manner which will be well understood. To cause a reversal of the direction of drive, the lever 27 is thrown toward the reversing-disk 24, when the wheel 14' will engage with said reversing-disk, driving it and the mechanism associated therewith in the direction opposite to the normal direction. It will be apparent that incidentally to such shifting of the driving-wheel 14' the remote end of the shaft 12' is slightly turned about the pivotal point 26, such motion being freely permitted by the construction of the split gear-casing, and suitable slight play afforded by the intermeshing teeth of the gears 13 13'.

While I have herein described in some particularity a construction which I deem to be operative and advantageous in many respects, I do not desire to be understood as limiting my invention in its broader aspect to the specific embodiment shown, as it will be apparent to those skilled in the art that many changes in the construction might be made without departing from the spirit and scope of my invention.

Having thus described my invention, what I claim, and desire to secure by Letters Patent of the United States, is—

1. In a device of the character described, a primary driving-shaft, a driving counter-shaft arranged for rotation in the opposite direction, opposing wheels on the driving and counter shafts, a driven disk between said driving-wheels, and the lever 27 and cam 29 for causing the operative engagement of both driving-wheels and the driven disk.

2. In a device of the class described, a primary driving-shaft, a counter-shaft, gearing connecting said shafts for coincident rotation in opposite directions, opposing wheels on said primary and counter shafts, a driven disk between said driving-wheels, and the lever 27 and cam 29 for moving one of said wheels into contact with the disk and the disk into contact with the other wheel.

3. In a device of the class described in combination, a primary driving-shaft, a counter-shaft, gearing connecting said shafts for coincident rotation in opposite directions, opposing wheels on said driving and counter shafts, each provided with a plurality of contact-surfaces at different radial distances from its center, a disk to be driven interposed between the driving-wheels, and having surfaces for coaction with the different surfaces of the driving-wheels, means for simultaneously shifting the driving-wheels longitudinally of the shaft to bring the different driving-surfaces to confront the corresponding surfaces of the disk to be driven, and the lever 27 and the cam 29 for causing engagement of both driving-wheels with the disk to be driven on opposite sides thereof.

4. In a device of the class described, a driving-shaft, a driving-wheel longitudinally movable on said shaft, and provided with two peripheral contact-surfaces at different radial distances from its axis, a disk to be driven arranged at right angles to the driving-wheel, provided with contact-surfaces in different planes, and an annular recess below the contact-surface of the disk in the plane most remote from the driving-shaft, in suitable relation to the contact-surface of the disk closest to the driving-shaft to receive the driving-surface of larger diameter of the wheel without driving contact, when the driving-surface of smaller diameter of the wheel is in operation, and means for bringing the respective coacting surfaces of said gear members into frictional contact.

5. In combination, in a machine of the class described, a plurality of disks to be driven, a plurality of driving-wheels between two of which one of the driven disks extend, the lever 27 and cam 29 for causing the engagement of the disk and the wheels on both sides thereof, and for causing the engagement of one of said wheels and another of the plurality of disks.

6. In a machine of the class described, in combination, two driving-wheels and two disks to be driven, arranged at right angles thereto, with one of the disks to be driven between said two driving-wheels and one of the driving-wheels between said two disks, and means for varying the relative positions of said members the lever 27 and cam 29 arranged to cause the engagement of the two wheels with the disk therebetween, and the engagement of the wheel between the disks with the disk on the side thereof opposite the other wheel.

In testimony that I claim the foregoing as my own I affix my signature in presence of two witnesses.

WILLIAM F. HOWE.

In presence of—
 GEO. T. MAY, Jr.,
 MARY F. ALLEN.